United States Patent [19]

Sternal et al.

[11] Patent Number: 5,929,757
[45] Date of Patent: Jul. 27, 1999

[54] METHOD AND APPARATUS FOR MAKING THROUGH-BORES

[76] Inventors: Bernd Sternal, Willi-Lohmann-Strasse 10; Juergen Blank, Steinbergstrasse 3, both of D-06507 Gernrode/Harz, Germany

[21] Appl. No.: 08/813,836

[22] Filed: Mar. 6, 1997

[51] Int. Cl.⁶ .................................................. G08B 21/00
[52] U.S. Cl. ...................... 340/540; 340/680; 340/686; 324/67
[58] Field of Search .................................. 340/540, 680, 340/551, 552, 553, 561, 686; 324/67, 207.17, 207.26, 239

[56] References Cited

U.S. PATENT DOCUMENTS

| | | | |
|---|---|---|---|
| 3,704,413 | 11/1972 | Blevins | 324/67 |
| 4,998,058 | 3/1991 | Tofte et al. | 324/67 |
| 5,434,500 | 7/1995 | Hauck et al. | 324/67 |

*Primary Examiner*—Daniel J. Wu
*Attorney, Agent, or Firm*—Karl Hormann

[57] ABSTRACT

The invention relates to a method and apparatus for marking entrance and exit opening sites in opposite surfaces of a wall member of a perforation to extend therethrough and is provided, at one surface at a site corresponding to one of the entrance and exit openings with a wave signal transmitter and, at the other surface with a wave signal receiver responding to transmitted signals by rendering an indication of a maximum strength wave signal as a function of the location of the other of the entrance and exit opening. In a preferred embodiment, the receiver is mounted on a drill or the like at a predetermined distance from the axis thereof and the transmitter is provided with a cantilever provided with a marker spaced from the transmitter at a distance corresponding to the predetermined distance.

15 Claims, 2 Drawing Sheets

METHOD AND APPARATUS FOR MAKING THROUGH-BORES

BACKGROUND OF THE INVENTION

1. Field of the Invention

The present invention relates generally to a method of and an apparatus for marking through-bores in walls, ceilings and other structural components of rooms and buildings. More particularly, the invention relates to a method and an apparatus of the kind referred operating by electromagnetic or ultrasonic radiation.

While such methods and apparatus are generally useful in all situations where entrance and exit openings of a bore or channel disposed in opposite surfaces of a structure need be defined precisely before such bore or channel, hereinafter sometimes referred to as "perforation", is drilled or sunk, they are of particular advantage when the surfaces in which entrance and exit openings of a perforation are disposed are not readily accessible at the same time to allow a precise determination of their respective position, or where the configuration of the two surfaces is so dissimilar as to defy an easy definition of these position by mechanical measurements.

2. The State of the Art

Marking the positions of entrance and exit openings of perforations in walls and the like by indirectly measuring longitudinal dimensions and angular degrees, even around a plurality of corners, curvatures and edges, has for a long time been standard practice in the building trades. Taking such measurements does, however, pose special difficulties and is a very disadvantageous and inefficient way of defining the course and direction of a perforation and its entrance and exit openings, particularly in building and rooms in which technical equipment is housed, such as, for instance, production machinery, workshops, laboratories, switching stations as well as installed electrical and plumbing facilities. Further difficulties present themselves in connection with front walls or facades of buildings.

It has also been know to sink test bores at non-hazardous and/or unobtrusive positions to establish reference points for placing marks for an actual perforation. This, too, however, is rather a complicated and involved way of placing indicia for through-bores and is unsuited for marking facades or in living, business or social function rooms.

OBJECTS OF THE INVENTION

It is an object of the invention to provide a simplified method of as well as apparatus for marking opposite surfaces of walls, ceiling and the like for the purpose of providing precisely placed perforations therein.

Another object of the invention is to provide a novel method of placing positional markings not relying on mechanical measuring steps.

Still another object of the invention resides in the provision of an apparatus for easily determining the precise location of markings of entrance and exit openings of bores penetrating through a wall or the like.

SUMMARY OF THE INVENTION

In an advantageous embodiment of the invention there is provided a novel method of determining precise locations in opposite surface of a wall or the like of entrance and exit openings of a perforation to be placed in such wall by placing a wave signal transmitter at a location of a wall surface at which either the entrance or exit opening of a perforation is to be placed and movably placing an echo signal receiver at the opposite wall surface, transmitting waves signals through the wall and moving the receiver into a location of maximum signal strength reception.

Alternatively, the antennae of transmitter and receiver may respectively be stationarily and movably placed at opposite surfaces of a wall to be perforated and transmitter and receiver are preferably combined with a transponder and are provided with visual and/or audible indicators.

Preferably, the transmitting and receiving antennae are orthogonally aligned directional antennae.

In a particularly advantageous embodiment of the invention signals derived by the receiving antenna may be amplified and processed by appropriate software and analog or digital data processing equipment such that the coordinates of the markings or indicia are rendered graphically perceptible so that the transmitting antenna or the transponder with its receiving antenna may be moved into coinciding positions thereby to give an indication of the respective positions of entrance and exit openings.

The apparatus in accordance with the invention comprises separate or integrated wave transmitters and receivers and a separate transponder including an antenna. The characteristics of transmitter, receiver and transponder are appropriately adjusted with respect to each other.

The receiver is provided with a pair of orthogonally aligned directional antennae and is of compact structure. Advantageously, it may either be mounted on the housing of an electric hand drill parallel to the axis of the drill or it may be integrated in the housing of such a tool. In addition, the transmitter and receiver may be provided with a reference antenna for the transponder at the opposite wall surface.

Advantageously, transmitter and receiver are intercomnecked with a data processor in such a way that by using appropriate software such that signals derived from the transponder in response to transmitted signals are rendered perceptible as coordinates, or digital or analog patterns in a display or by a pointer and scale indicator, or they are stored in a memory for transmission to a remote processor. The transponder housing or the indicator as well as the display on a hand drill are provided with a vertical indicator or an angular degree scale in alignment with transmitter or transponder and receiver.

With the apparatus of the invention, entrance and exit openings of a perforation extending through a wall or the like may be precisely marked with great efficiency.

DESCRIPTION OF THE SEVERAL DRAWINGS

The novel features which are considered to be characteristic of the invention are set forth with particularity in the appended claims. The invention itself, however, in respect of its operating steps and the sequence thereof, and the structure, construction and lay-out as well as manufacturing techniques involved in apparatus for practicing the invention, together with other objects and advantages thereof, will be best understood from the following description of preferred embodiments when read in connection with the drawings, in which:

FIG. 1 is a schematic presentation of an arrangement in accordance with the invention adjacent to a wall and the transmitter and receiver circuit; and FIG. 2 is a schematic presentation of a hand drill incorporating the apparatus in accordance with the invention.

DETAILED DESCRIPTION OF PREFERRED EMBODIMENTS

Figure 1:
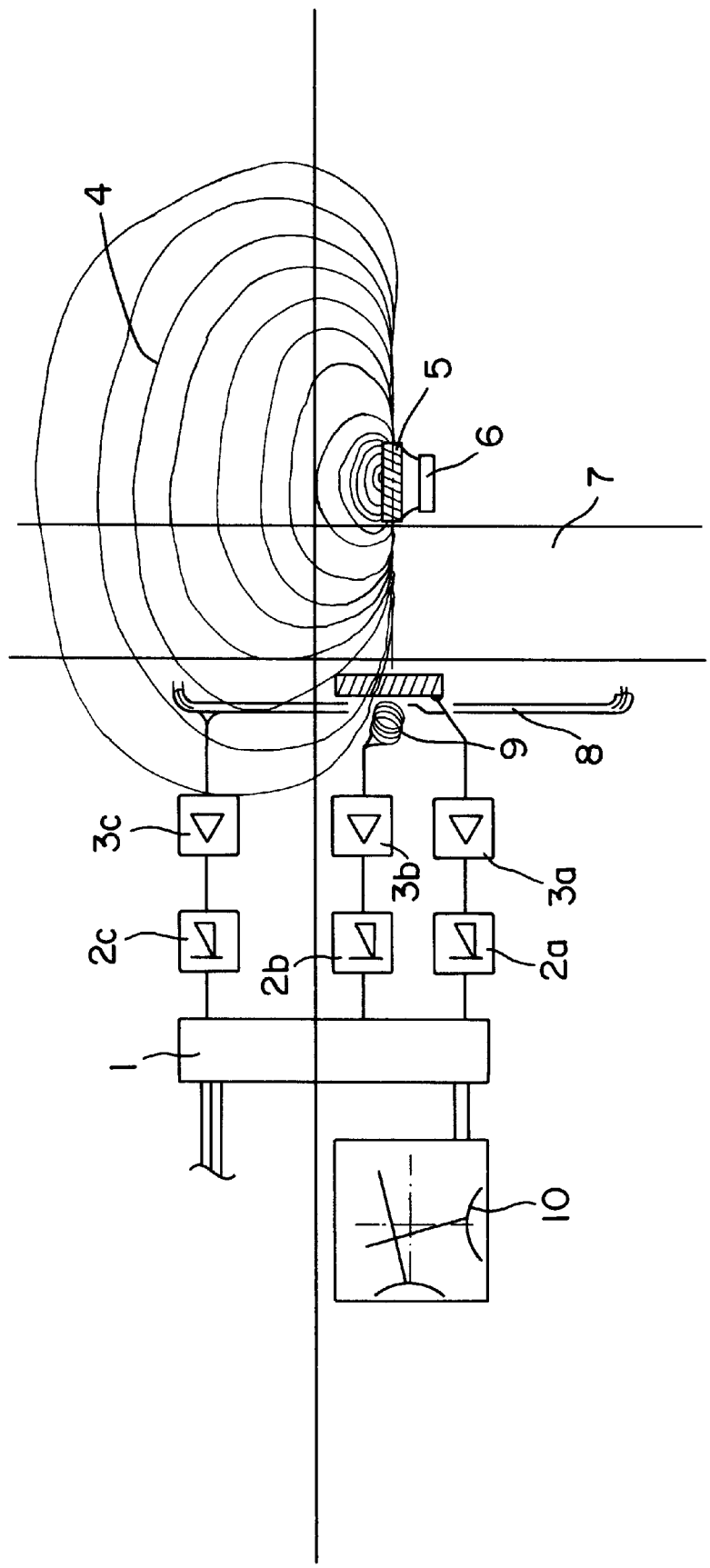
Figure 2:
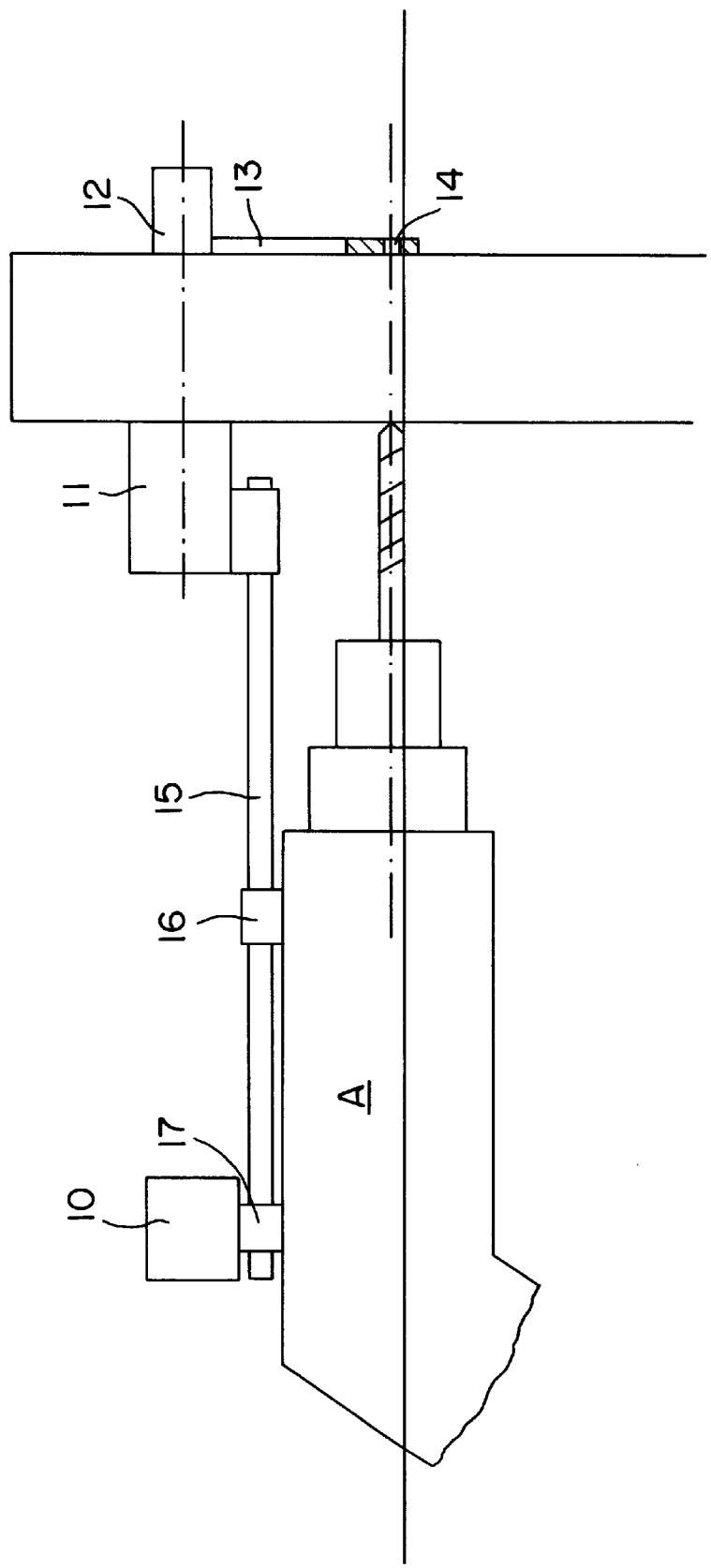

A wave transmitter and receiver, preferably in miniaturized form, of electromagnetic radiation are mounted on a hand drill A, in a manner to be described. As used herein, "wave" is intended to connote electromagnetically, magnetically or ultrasonically propagated energy. The transmitter and receiver 2 a–c is shown to include an amplifier 3 a–c, a transmitter antenna 9a, a receiving antenna 9b, a reference antenna 8, a data processor or computer 1 as well as indicators or displays 10 in a housing 11. The housing 11 is supported by a rail 15 which is mounted for sliding movement within guide brackets 16 and 17. A transponder 6 is mounted within a separate housing 12 and is provided with a ferrite antenna 5. The antenna 5 is seen to be disposed orthogonally relative to the transmitter antenna 9a. Frequency and sensitivity of the transponder 6 are set to conform to those of the transmitter and receiver mounted on the housing of the drill A. As may be seen, a cantilever 13 provided with a marking hole 14 is extending orthogonally from the housing 12.

To put a perforation through a wall 7 and for marking the wall 7 on one surface thereof, the exit position of the intended perforation is marked by placing the transponder 6 on the surface of the wall 7 opposite the surface where the transmitter and receiver are positioned such that its marking hole 14 is placed over that exit position. The drill A is then moved over the surface of the wall 7 until it arrives in a position at which the strength of the echo or response signal from the transponder 6 received by the receiver is indicated in the display 10 to have reached its maximum. It will be apparent that the spacing between the transponder antenna 5 and the marking hole 14 is equal to the spacing between the axis of the drill and the transmitter antenna 9a. Fine tuning of the relative positions between the electric drill A and transmission antenna 9a at one surface of the wall 7 and of the transponder 6 and marker hole 14 at the opposite wall surface may subsequently be accomplished by a cross-hair reticle in the display 10 or by a digital echo signal display. The cantilever 13 on the housing 12 of the transponder as well as the display 10 are provided with vertical position markers by means of which the initial drill position and the marking hole 14 may be moved into coincidence.

It will be appreciated by those skilled in the art that certain changes and alterations may be made in the apparatus and method herein broadly described, all of which will be embraced by the scope of the claims hereinafter set forth.

What is claimed is:

1. A method of marking entrance and exit openings of a perforation to extend between opposite surface areas of a wall member, comprising the steps of:

placing means for transmitting a first wave signal at one of said opposite surface areas at a location corresponding to one of said entrance and exit openings;

activating said first wave signal transmitting means by a second wave signal generated by a second wave signal transmitting means at the other of said opposite surfaces for transmitting said first wave signal through said wall member;

moving first wave signal receiving means over the other of said opposite surface areas into a position where a signal of maximum strength of said first wave signal is received;

providing means connected to said first wave signal receiving means for providing an indication of said signal of maximum strength; and placing a mark in said other of said opposite surfaces corresponding to the other of said exit and entrance openings.

2. The method of claim 1, further comprising the step of feeding the received maximum strength first wave signal through means connected to said indication means for processing said maximum strength first wave signal.

3. An apparatus for marking entrance and exit openings of a perforation to extend through a wall member comprising opposite surface areas, comprising:

means for transmitting a first wave signal from a location corresponding to one of said entrance and exit openings in one of said opposite surface areas;

means at the other of said opposite surfaces for transmitting a second wave signal and means at said one surface responsive to said second wave signal for activating said means for transmitting said first wave signal;

means movable over the other of said opposite surface areas for receiving said first wave signal;

means for processing said received first wave signal to derive a maximum strength first wave signal in response to the movement of said movable receiving means;

means connected to said first wave signal processing means for rendering an indication of said maximum strength first wave signal as a function of the location of the other of said entrance and exit openings in the other of said opposite surfaces; and means for marking the location of the other of said entrance and exit openings.

4. The apparatus of claim 3, wherein said first and second wave signal transmitting means are respectively provided with orthogonally aligned antenna means.

5. The apparatus of claim 3, wherein said first wave signal processing means includes software controlled data processing means.

6. The apparatus of claim 3, wherein said indication rendering means comprises pointer and scale indicators.

7. The apparatus of claim 3, wherein said indication rendering means comprises digital display means.

8. The apparatus of claim 3, wherein said means for transmitting said first wave signal comprises transponder means.

9. The apparatus of claim 8, wherein said means for transmitting said second wave signal is combined with said first signal receiving means.

10. The apparatus of claim 3, wherein said indication rendering means comprises visual display means.

11. The apparatus of claim 10, wherein said visual display means comprises cross-hair reticle means.

12. The apparatus of claim 3, wherein said first wave signal transmitting is provided with cantilever means and wherein said cantilever means is provided with marker means spaced a predetermined distance from said first wave signal transmitting means.

13. The apparatus of claim 12, wherein said second wave signal transmitting means is mounted on drill means and is aligned in parallel to the axis thereof at a spacing corresponding to said predetermined distance.

14. The apparatus of claim 13, wherein said indication rendering means is mounted on said drill means.

15. The apparatus of claim 13, wherein said cantilever and said drill means are provided with vertical disposition alignment means.

* * * * *